T. E. MURRAY.
PIPE CONNECTION AND METHOD OF MAKING SAME.
APPLICATION FILED OCT. 25, 1918.
1,302,412.
Patented Apr. 29, 1919.
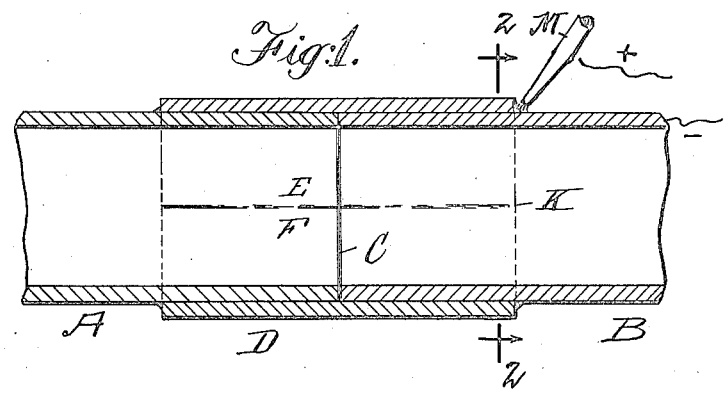
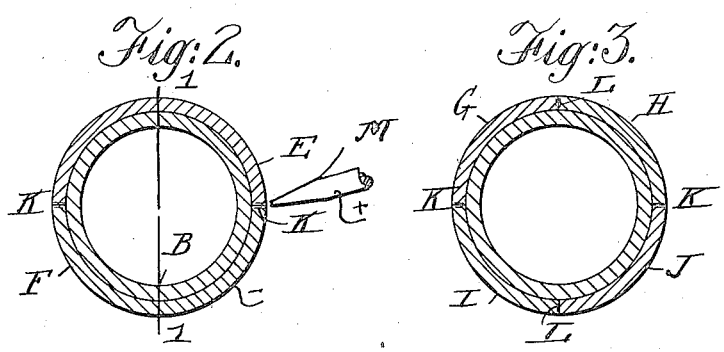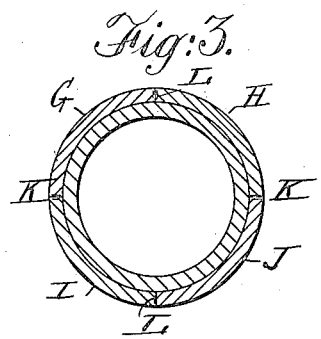
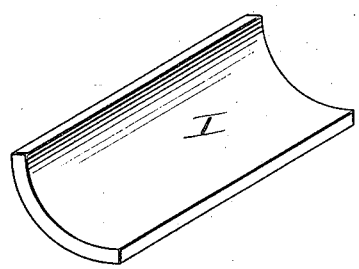
Inventor
Thomas E. Murray
By his Attorney

UNITED STATES PATENT OFFICE.

THOMAS E. MURRAY, OF NEW YORK, N. Y.

PIPE CONNECTION AND METHOD OF MAKING SAME.

1,302,412.      Specification of Letters Patent.      Patented Apr. 29, 1919.

Application filed October 25, 1918. Serial No. 259,620.

*To all whom it may concern:*

Be it known that I, THOMAS E. MURRAY, a citizen of the United States, residing at New York, in the county of New York and State of New York, have invented a certain new and useful Improvement in Pipe Connections and Methods of Making Same, of which the following is a specification.

The invention is a pipe connection and method of making same.

In the accompanying drawings—

Figure 1 is a pipe connection made in accordance with my method, on the line 1, 1 of Fig. 2. Fig. 2 is a section on the line 2, 2 of Fig. 1. Fig. 3 is a section similar to Fig. 2, showing the reinforcing sleeve made in four parts. Fig. 4 is a perspective view of one of the parts of the reinforcing sleeve, as shown in Fig. 3.

Similar letters of reference indicate like parts.

A and B are pipes electrically butt-welded together at C. The reinforcing sleeve D is formed of a plurality of longitudinal sections, two half sections E, F being shown in Fig. 2 and four quarter sections G, H, I, J being shown in Fig. 3. The sections forming the sleeve are placed upon the pipes A, B so as to cover the welded joint C, with their straight edges in registering contact, and are arc-welded along the joints as K, K, Figs. 1 and 2, and K, K, L, L, Fig. 3. The outer edge faces of the reinforcing sleeve D are then arc-welded to the pipes A, B. The arc welding is accomplished by manually moving a pencil electrode M connected in circuit with the pipes along the exterior of the joints at K, L and in the angle between the end faces of sleeve D and the outer surfaces of pipes A, B.

I have found by experiment that pipe connections made as set forth will resist abnormally high internal fluid pressures. As an example, I am carrying a working pressure of 190 pounds per square inch on 14 inch steel piping connected as above described.

I claim:

1. The method of making pipe joints, which consists in, first, electrically butt-welding the pipes to be united, and, second, applying to said pipes to cover the joint between them a plurality of longitudinal reinforcing sleeve sections with their straight edges in contact-registry and arc welding said edges together.

2. The method of making pipe joints, which consists in, first, electrically butt-welding the pipes to be united, second, applying to said pipes to cover the joint between them a plurality of longitudinal reinforcing sleeve sections with their straight edges in contact-registry and arc welding said edges together, and, third, arc welding the ends of said completed reinforcing sleeve to said pipes.

3. In combination with two pipes electrically butt-welded together, a reinforcing sleeve having internally a substantially smooth surface covering the joint between said pipes and consisting of a plurality of longitudinal sections with their straight edges in registering contact and electrically welded together, the said sleeve being electrically welded at its ends to said pipes.

In testimony whereof I have affixed my signature in presence of two witnesses.

THOMAS E. MURRAY.

Witnesses:
   GERTRUDE T. PORTER,
   MAY T. McGARRY.